United States Patent [19]

Grosbard

[11] Patent Number: 4,752,429

[45] Date of Patent: Jun. 21, 1988

[54] PROCESS OF SHAPING THERMOPLASTIC MATERIAL CONTAINING A CARBOHYDRATE ADDITIVE

[76] Inventor: Gregory Grosbard, 16353 NW. 57th Ave., Miami, Fla. 33014

[21] Appl. No.: 903,039

[22] Filed: Sep. 2, 1986

[51] Int. Cl.⁴ .......................... B29C 47/00; C08J 3/20
[52] U.S. Cl. ................... 264/141; 264/210.6; 264/211; 524/27; 524/58; 524/732
[58] Field of Search ...................... 264/210.6, 217, 211, 264/564, 141; 524/27, 58, 732

[56] References Cited

U.S. PATENT DOCUMENTS

| | | | |
|---|---|---|---|
| 2,698,463 | 1/1955 | Conwell et al. | 264/211 X |
| 3,097,915 | 7/1963 | Doyle | 264/38 X |
| 3,387,073 | 6/1968 | Larsen | 264/211 |
| 3,639,312 | 2/1972 | Turner | 524/58 X |
| 4,013,622 | 3/1977 | DeJuneas et al. | 264/211 X |
| 4,026,849 | 5/1977 | Bagley et al. | 264/176.1 X |
| 4,303,571 | 12/1981 | Jansen et al. | 264/331.15 X |
| 4,340,550 | 7/1982 | Ho | 264/13 |
| 4,472,556 | 9/1984 | Lipowitz et al. | 264/211 X |
| 4,489,034 | 12/1984 | Davison | 264/331.15 |

*Primary Examiner*—Jeffery Thurlow
*Assistant Examiner*—Leo B. Tentoni
*Attorney, Agent, or Firm*—Jacob Shuster

[57] ABSTRACT

A thermoplastic resin is homogeneously mixed with a carbohydrate additive within a predetermined weight ratio range and then extruded under the usual extrusion temperature and pressure conditions to enhance physical properties of the extruded material.

9 Claims, No Drawings

PROCESS OF SHAPING THERMOPLASTIC MATERIAL CONTAINING A CARBOHYDRATE ADDITIVE

BACKGROUND OF THE INVENTION

This invention relates generally to improvements in the shaping of products from synthetic plastic resin and more particularly to enhancing the physical properties of such products.

One type of widely used synthetic resin product is extruded, thermoplastic film such as polyethylene. Attempts to improve the properties of such film are disclosed for example, in U.S. Pat. No. 3,097,915 to Doyle, wherein a conventional film extruder is utilized and the film is treated after it emerges from the slot die portion of the extruder. Other attempts to improve polyethylene film have involved chemical modification of the polyethylene resin before shaping, as disclosed for example in U.S. Pat. Nos. 4,303,571 and 4,489,034 to Jansen et al and Davison, respectively, or in the preparation of polyethylene pellets as disclosed for example in U.S. Pat. No. 4,340,550 to Ho.

Prior art methods such as those discussed above, although useful in enhancing polyethylene film for various limited purposes, involved costly chemical modification of the thermoplastic material or expensive physical treatment. It is therefore an important object of the present invention to provide a more cost effective method of improving physical properties of thermoplastic products with substantially no alteration of the product shaping process and without any supplemental treatment.

SUMMARY OF THE INVENTION

An important discovery of the present invention resides in an unexpected preservation of physical strength of thermoplastic material subjected to relatively high temperatures and pressure conditions while undergoing a shaping process. Such result was achieved by prior mixing of the material with a low cost carbohydrate additive within a limited range of weight ratios between approximately 400 and 5000 p.p.m. With respect to the extrusion of polyethylene film, a further discovery was made in its unexpected acquisition of a beneficial physical property such as gas impermeability. Similar benefits are contemplated with respect to other thermoplastics subjected to strength reducing conditions of their shaping processes, such as injection molding.

While the present invention is not to be limited by any particular theory of operation, the physical strength reducing effect of the film extrusion process condition on polyethylene is believed to be caused by replacement of some carbon atoms in the polyethylene molecular chain by oxygen atoms to which the material is exposed under extrusion conditions. The use of chemical oxidants to eliminate or minimize such oxygen exposure would be an obvious solution, but would require costly chemical reactions and environmental controls as well as to introduce other problems. By use of a carbohydrate additive premix in accordance with the present invention, those carbon atoms of the molecular chain which tend to be replaced by oxygen are instead replaced by other carbon atoms from the additive. Thus, the strength reducing replacement of carbon atoms is prevented or decreased. The foregoing action of the carbohydrate additive occurs under the usual extrusion temperature and pressure conditions so that no alteration in the extrusion process or apparatus is required. For reasons not as yet understood, polyethylene film produced in accordance with the present invention is not only physically stronger than standard film but is relatively non-porous to gas. Further, because of its increased strength polyethylene film in accordance with the present invention may be made substantially thinner than standard film of comparable strength.

DETAILED DESCRIPTION OF PREFERRED EMBODIMENTS

The present invention embraces methods of improving physical properties of thermoplastic products produced by a shaping process in which certain temperature and pressure conditions exist to which a carbohydrate additive responds. According to the specific examples hereinafter set forth, the thermoplastic material being processed include high and low density polyethylene pellets and reprocessed polyethylene pellets. The shaping process involves a conventional film extrusion method and apparatus in which the polyethylene pellets are heated to a melt temperature of between 150° C. and 210° C. The physical properties of standard film and additive modified film compared, are tensile and impact strength and gas porosity. As to the additive, carbohydrate compounds of all types are contemplated, including crystalline carbohydrates, monosaccharides, artificial sweeteners, grain and legume mold compounds, fruit and vegetable preparations, such as honey, molasses, corn and fruit syrups, etc. In the specific examples set forth hereinafter, cane sugar and fructose in solid particulate form were utilized as the carbohydrate compound in the additive.

The carbohydrate additive was introduced and mixed homogenously with the polyethylene and placed in the hopper of the extruder from which the mixture was displaced through heating and compression zones. The molten mixture was then forced under compression through the die of the extruder from which the film emerged. A relatively small quantity of additive was utilized as compared to the quantity of polyethylene pellets charged into the hopper. Significant improvements in physical property were exhibited with use of as low as 0.4 grams of additive for each 10 kilograms of pellets (400 p.p.m.). Above 5 grams of additive per 10 kilograms of pellets (5000 p.p.m.), physical property improvement subsided.

The following specific examples, which are not to be considered as limiting in scope, further illustrate the invention.

EXAMPLE I

Utilizing a high density polyethylene in pellet form, such as "Fortiflex XF-469A" marketed by Soltex, rolls of flexible film were produced by extrusion for testing purposes. A melt temperature of 190° C. was used in an extrusion process, such as that disclosed in U.S. Pat. No. 3,097,915 to Doyle, aforementioned. The carbohydrate additive in the form of refined cane sugar was homogenously mixed with the polyethylene and placed in the hopper after which the mixture underwent its heating and compression within the screw conveyer portion of the extruder. The extrusion die was set to produce a standard film having a thickness of 0.000775 inches. The average thickness of the additive modified film produced on the other hand, was 0.000800 inches.

Both the standard film and the additive modified film underwent tensile and impact rupture tests under the same conditions. The tensile rupture test involved elongation of 30 millimeters square film specimens in two perpendicular directions. Based on such tests, an average rupture elongation value was calculated to provide a tensile rupture strength measurement in terms of millimeters of elongation. The impact rupture test involved dropping of a mass on film specimens of 8 inches by 8 inches inserted into a conventional dart impact test apparatus. Impact rupture strength measurements were thereby obtained in terms of grams of impact weight.

The foregoing tensile and impact rupture tests were performed on standard polyethylene film and the film modified by use of additives mixed at different weight ratios to the polyethylene pellets. The results of the rupture strength tests are shown in the following table I:

TABLE I

| Additive quanitity (grams per 10 kg polyethylene) | Rupture Stength tensile elongation (ml) | impact weight (g) |
|---|---|---|
| (Standard specimen) 0 | 174 | 60.0 |
| (additive modified 0.4 | 243 | 66.9 |
| specimens) 0.6 | 240 | 69.3 |
| 1.0 | 233 | 77.0 |
| 2.5 | 265 | 66.0 |
| 3.0 | 239 | 85.0 |
| 4.0 | 238 | 72.0 |
| 5.0 | 265 | 64.0 |

It will be apparent from the foregoing table that a significant improvement in film strength was obtained, as compared to standard film, by mixing the polyethylene pellets with the additive at a weight ratio of as high as 25000 to 1, corresponding to the 0.4 grams of additive to 10 kilograms of polyethylene pellets as shown in table I. For weight ratios below 2,000 to 1, the table shows that strength improvement subsides at least with respect to impact strength.

The same comparative rupture strength tests were performed with respect to standard film having a thickness of 0.000775 inches and additive modified film having a thickness of 0.000500 inches, approximately 50% thinner than the standard film. Although there was minimal change in impact strength, the additive modified film did exhibit an approximately 30% increase in tensile strength over the standard film despite its thinner gauge. The latter comparative tests therefore demonstrated that a savings in material may be realized by use of thinner film to meet strength requirements heretofore dictating a thicker standard film.

Further, the additive modified film produced in accordance with the present Example I exhibited a gas impermeability property in sharp contrast to the expected gas porosity characteristic of standard polyethylene film. Such gas impermeability property of the additive modified film was demonstrated by its successful use for product packaging in a vacuum shrinkage process which requires a low gas porosity packaging film to the exclusion of the usual polyethylene film.

EXAMPLE II

The same high density polyethylene film as described and tested under EXAMPLE I, was modified by use of a carbohydrate additive which included ingredients such as hydoquinone to fix the hydrogen and oxygen in the carbohydrate compound, bicarbonate of soda to alkalize the additive mixture and sodium chloride (salt) to fix the hydrogen. Various plural ingredient additive mixtures and their affects on the film rupture strength are shown in the following Table II.

TABLE II

| Additive No. | Additive Quantity (grams per 10 kg of polyethylene) | | | | Rupture Strength | |
|---|---|---|---|---|---|---|
| | Cane Sugar | Hydro quinone | Bicarbonate of Soda | Sodium Chloride | tensile elongation (ml) | impact weight (g) |
| 1 | 0.50 | 0.5 | 0 | 0 | 236 | 70 |
| 2 | 0.50 | 0 | 0.5 | 0 | 160 | 52 |
| 3 | 0.65 | 0 | 0 | 0.65 | 170 | 50 |
| 4 | 1.00 | 0 | 0 | 1.50 | 227 | 75 |
| 5 | 1.00 | 1.5 | 0 | 1.50 | 201 | 71 |

In comparison with standard film as shown in Table I hereinbefore, additive No. 1 as shown in the foregoing Table II exhibited the optimum benefits in so far as both rupture strength and gas impermeability are concerned.

EXAMPLE III

In this example, a low density polyethylene #5455 made by Gulf Oil Co. was utilized to extrude film tested as described under Example I. In extruding the film, however, the polyethylene pellets were heated to a melt temperature of 170° C. and the carbohydrate additive was in the form of fructose at a weight ratio of 1 gram per 10 kilograms of pellets. The average thickness of the additive modified film was 0.001063 inches as compared to a thickness of 0.001000 inches for the standard film without additive. Comparative rupture test results are shown in the following table:

TABLE III

| Low density polyethylene film | Rupture Strength | |
|---|---|---|
| | tensile elongation (ml) | Impact weight (g) |
| Standard | 160.5 | 139.5 |
| Additive Modified | 159.4 | 174.5 |

It will be apparent from the foregoing Table III that additive modified film of the low density polyethylene type exhibited an approximately 25% increase in impact strength with minimal change in tensile strength.

EXAMPLE IV

Low density, polyethylene film was partially reprocessed and tested as described under Example I to determine the affect of reprocessing on the benefits produced by the present invention. The reprocessed film was produced from a mixture of 80% polyethylene film scrap that was chopped and pelletized and 20% of linear low density virgin pellets. A melt temperature of 160 C. was used in the extrusion process. The standard, reprocessed film had a thickness of 0.00103 inches while the reprocessed film modified by carbohydrate additive of 1.2 grams cane sugar per 10 kg had a thickness of 0.00105 inches. Comparative test results are shown in the following table:

TABLE IV

| Reprocessed film | Rupture strength | |
|---|---|---|
| | tensile elongation (ml) | Impact weight (g) |
| Standard | 170.44 | 94.5 |
| Additive modified | 224.13 | 104.5 |

The foregoing table shows that reprocessed film modified by carbohydrate additive exhibited a 10% increase in impact strength and a 31% increase in tensile strength.

EXAMPLE V

In this example, a high molecular weight high density polyethylene film resin, marketed by American Hoechst Corporation under the name "GM 9255 F2", was processed in a Kuhma 55 mm Blow Film System Extruder at a melt temperature of 200° C. to produce four (4) different test samples.
Natural
A=0.6 gram per 10 Kg Hydroquinone
B=0.6 gram per 10 Kg Cane Sugar A—B=0.6 gram Cane Sugar+0.6 gram Hydroquinone per 10 Kg Comparative test results are shown in the following table:

TABLE V

All extruded film was produced at a thickness of 0.0008 inches. Sample "A" flowed through the extruder at an increased output of +3.2%. Sample "B" flowed through the extruder at an increased output of +10.1%. Sample "A/B" flowed through the extruder at an increased output of +0.5%.

| Sample | Dart Drop | | Elmendorf (MD/TD) | | Spencer Impact | |
|---|---|---|---|---|---|---|
| Natural | 45 g | | 23/64 | | .30 | |
| A | 67 g | +49% | 16/188 | +135% | .31 | +3.3% |
| B | 62 | +38% | 21/268 | +232% | .43 | +43% |
| A/B | 56 | +24% | 27/236 | +202% | .28 | −6.7% |

| Natural | | |
|---|---|---|
| Tensile Yield MD/TD (PSI) | 0/3330 | |
| Tensile Failure MD/TD (PSI) | 8240/4570 | |
| Elongation at Failure MD/TD (%) | 410/600 | |
| Sample A | | |
| Tensile Yield MD/TD (PSI) | 0/3810 | +14.4% |
| Tensile Failure MD/TD (PSI) | 8810/4670 | +5.2% |
| Elongation at Failure MD/TD (%) | 460/640 | +8.9% |
| Sample B | | |
| Tensile Yield MD/TD (PSI) | 0/3810 | +14.4% |
| Tensile Failure MD/TD (PSI) | 10520/4910 | +20.5% |
| Elongation at Failure MD/TD (%) | 410/770 | +16.8% |
| Sample A/B | | |
| Tensile Yield MD/TD (PSI) | 0/3950 | +18.6% |
| Tensile Failure MD/TD (PSI) | 9050/4710 | +7.4% |
| Elongation at Failure MD/TD (%) | 440/710 | +13.9% |

The percentage calculations for the Elmendorf, Tensile, and Elongation tests are calculated by using MD + TD/2 as a base for comparison with the natural samples. The dart drop test was done using a 152.4 cm (60") drop height.

While certain materials, examples, and process steps have been described herein for purposes of illustration, it is to be understood that the invention is not limited thereto but may be otherwise practiced within the scope of the following claims.

What is claimed is:

1. A process for improving the physical properties of tensile and impact strength with respect to a solid, thermoplastic polymer comprising:
   (a) mixing in said polymer from about 400 to about 5000 p.p.m. of a sugar;
   (b) then heating the polymer with the sugar mixed therein to a temperature between approximately 150° C. and 210° C. for shaping thereof, and
   (c) fabricating the polymer into a shaped article under said shaping temperature.

2. A process for improving gas impermeability with respect to polyethylene comprising:
   (a) mixing in said polyethylene from about 400 to about 5000 p.p.m. of a sugar;
   (b) then heating the polyethylene with the sugar mixed therein to a temperature between approximately 150° C. and 210° C. for shaping thereof, and
   (c) fabricating the polyethylene into a shaped article under said shaping temperature.

3. The method of claim 1 wherein said thermoplastic polymer prior to said shaping thereof is polyethylene in pellet form.

4. The improvement as defined in claim 1 wherein said sugar is a monosaccharide.

5. The improvement as defined in claim 4 wherein said monosaccharide is cane sugar.

6. The improvement as defined in claim 1 wherein said thermoplastic polymer is polyethylene and the shaping thereof consists of extrusion into a flexible film.

7. The process of claim 1 wherein said fabricating consists of extruding the heated polymer into a film as the shaped article.

8. The process of claim 1 wherein said polymer is pelletized before mixing of the sugar therewith.

9. The process of claim 2 wherein the fabricating consists of extruding the heated polymer into a film as the shaped article.

* * * * *